United States Patent [19]

Doniger et al.

[11] 3,773,281

[45] Nov. 20, 1973

[54] AUTOMATIC FLIGHT CONTROL SYSTEM USING INSTRUMENT LANDING SYSTEM INFORMATION AND INCLUDING INERTIAL FILTERING MEANS FOR REDUCING ILS NOISE

[75] Inventors: Jerry Doniger, Montvale; Frederic L. Swern, Bogota, both of N.J.

[73] Assignee: The Bendix Corporation, Teterboro, N.J.

[22] Filed: June 18, 1971

[21] Appl. No.: 154,517

[52] U.S. Cl. .............................. 244/77 A, 244/77 G
[51] Int. Cl. ............................................ B64c 13/50
[58] Field of Search............. 244/77 R, 77 A, 77 D, 244/77 G, 3.15, 3.19, 3.2, 3.21; 343/108 R, 108 M, 107; 235/150.22; 318/489

[56] References Cited
UNITED STATES PATENTS

| | | |
|---|---|---|
| 2,981,500 | 4/1961 | Carlton .............................. 244/3.15 |
| 3,132,828 | 5/1964 | Edinger et al. ........................ 244/77 |
| 3,223,362 | 12/1965 | Doniger .............................. 244/77 A |
| 3,335,980 | 8/1967 | Doniger et al. ...................... 244/77 A |
| 3,447,765 | 6/1969 | Doniger et al. ...................... 244/77 A |
| 3,489,378 | 1/1970 | Watson et al. ....................... 244/77 A |
| 3,652,835 | 3/1972 | Devlin et al. ................... 235/150.22 |

*Primary Examiner*—Milton Buchler
*Assistant Examiner*—Barry L. Kelmachter
*Attorney*—Anthony F. Cuoco et al.

[57] ABSTRACT

A flight control system includes localizer and glide path couplers using instrument landing system (ILS) information and inertially sensed data to generate appropriate control signals, and inertial filtering means for providing significant attenuation of ILS noise to reduce spurious signal generation.

7 Claims, 4 Drawing Figures

AUTOMATIC FLIGHT CONTROL SYSTEM USING INSTRUMENT LANDING SYSTEM INFORMATION AND INCLUDING INERTIAL FILTERING MEANS FOR REDUCING ILS NOISE

BACKGROUND OF THE INVENTION

1. Field of the Invention

This invention relates to flight control systems and, particularly, to flight control systems using localizer and glide path couplers. More particularly, this invention relates to flight control systems of the type described including means for reducing the sensitivity of instrument landing system (ILS) approach coupling systems while maintaining accurate control of the aircraft under gust conditions with attendant low levels of spurious cockpit control activity or aircraft motion.

DESCRIPTION OF THE PRIOR ART

Most flight control systems with approach coupling means use standard instrument landing systems (ILS) localizer and glide path radio guidance signals as references. The localizer guidance signal is referenced to the extended centerline of the runway. The glide slope guidance signal defines a vertical path that intersects the approach end of the runway at a prescribed angle from the horizontal, generally about 2.7°.

The radio guidance provides proportional present position angular data with respect to the effective origin of the transmitted signals. These radio signals are affected by terrain variations including hills or large buildings, or over-flying aircraft that act as reflectors. The total, direct and reflected, position data received in the aircraft provides the useful long term track references as well as providing short term noise.

This noise is a major problem associated with the design of ILS coupled automatic and manual flight control systems. These systems must have high gain to force the aircraft to maintain an accurate approach track that will insure desirably small lateral and longitudinal landing dispersions, particularly under various wind conditions. The high gain, however, makes the approach coupler configurations sensitive to the received beam noise, particularly at frequencies that result in rapid cockpit control and display activity as well as spurious aircraft rolling and pitching activity. It is important therefore, that a mechanization be provided to significantly reduce the sensitivity of ILS coupling systems while maintaining accurate control of the aircraft under gust conditions with attendant low level spurious cockpit control activity or aircraft motion.

Flight path integrations due to aircraft motion force the system designer to provide, in the ILS coupler mechanization, some sort of damping term to maintain desirable system stability. Generally, in order to provide damping for a beam displacement control loop, some measure of beam rate is necessary. Explicit rate filters have been used in the past. They provide stable performance and accurate tracking under wind conditions, but at the unacceptable sacrifice of spurious control surface and attitude responses when subjected to the aforenoted ILS noise.

Approximate measures of beam rate can be generated by using changes in heading for localizer and changes in pitch attitude for glide path. This has been successfully used in approach couplers for many years, with the primary advantage being that the measurement is derived from inertial references which already exist for use in the autopilot or flight director. The disadvantages are that path tracking is inaccurate under gust or wind conditions and the beam displacement signals are unfiltered.

In order to improve tracking accuracy under wind conditions, the beam rate parameter must be increased and the system noise responses thus degraded. The wind performance is degraded by systems using this principle since gusts require the aircraft to weathercock to minimize lateral or normal accelerations which move the aircraft away from its intended track. Explicit heading and pitch attitude control inhibits this desirable gust weathercocking, and the aircraft is forced to deviate from the intended path.

In order to overcome these disadvantages, localizer coupler arrangements have used a lagged function of roll attitude to provide primary path damping and roll attitude to provide primary path damping and veinier low gain damping is provided by beam rate and heading. The lagged roll parameter approximates the integral of roll that is proportional to the change in heading, or beam rate. This term is effective since it does not interfere with the lateral weathercocking of the aircraft in gusts.

However, systems which depend on a lagged roll function alone for damping require sufficiently high gain to be susceptible to low amplitude, long period oscillations that result from the lag filter not being a pure integration. A pure integration cannot be used since practical system design must allow for drift of integration devices. In addition, a separate integrator is normally used to provide trim compensation and the two integrators provide an undesirable oscillatory mode for the system. Therefore, beam rate and/or heading terms are used in conjunction with the lagged roll term. These added terms, however, must be carefully tailored to minimize beam noise effects and wind gust performance degradation.

A filtered altitude rate signal has been used in the pitch axis to improve wind gust performance of the attitude reference (glide slope) system. The altitude rate loop is stabilized by a rapidly washed out barometric altitude signal and a pitch rate signal, and which signals are not significantly involved with the aircraft track responses. The undesirable feature of the altitude signal is its susceptibility to gust noise and local flow effects at the static ports which introduce additional noise into the system. In addition, the need for barometric reference during a final approach, particularly in redundant systems, requires considerable system complexity. Also, for large aircraft, ground effects create additional disturbances on the altitude rate signal at low altitudes.

A modified glide path coupler arrangement in which the lagged normal acceleration term is substituted for the barometric altitude rate signal has been used. This arrangement provides improved wind shear performance over the attitude system without the attendant beam noise sensitivity of the rate system. However, the use of a simple body mounted accelerometer is subject to null offsets which are propogated through the high gain lag filter to drive the aircraft from the ILS glide path reference.

SUMMARY OF THE INVENTION

The flight control system of the invention provides excellent wind performance (track accuracy) and low noise susceptibility, as compared with the pure lagged roll system for localizer or the attitude damped system for glide path, and very low susceptibility to the long term tracking inaccuracies that result from roll attitude or normal acceleration offsets. Accordingly, the invention contemplates providing a heavily filtered rate signal which is formed to provide a good low frequency beam rate reference. High frequency noise (nominally have 0.1 radian per second) is increasingly attenuated. A short term beam rate reference signal is provided using filtered roll attitude in localizer and filtered normal acceleration in glide path. In this manner low frequency effects such as null offsets of the inertial sensors are greatly attenuated. The low and high frequency beam rate terms are combined to form a single wide band, relatively noise free beam rate signal. The beam rate signal is limited to further restrict the noise response of the system and inertial navigation apparatus can be used to provide further noise immunity.

One object of this invention is to provide a flight control system using localizer and glide path couplers responsive to ILS information and inertially sensed data to generate appropriate control signals, and including means for providing significant attenuation of ILS noise to reduce spurious signal generation.

Another object of this invention is to significantly reduce the sensitivity of ILS approach coupling systems, while maintaining accurate control of the craft under gust conditions, with attendant low levels of spurious cockpit control activity or aircraft motion.

Another object of this invention is to provide a flight control system having excellent wind gust performance (track accuracy), low noise susceptibility and low susceptibility to long term tracking inaccuracies that result from roll attitude and normal acceleration offsets.

Another object of this invention is to use the inertial elements normally existing in flight control systems to provide significant filtering of ILS localizer and glide path beam noise while providing accurate well-damped performance.

Another object of this invention is to utilize inertial navigation system data to provide further noise immunity.

Another object of this invention is to provide strategically located ILS beam rate signal limits for further reducing large amplitude noise attenuation of the system.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
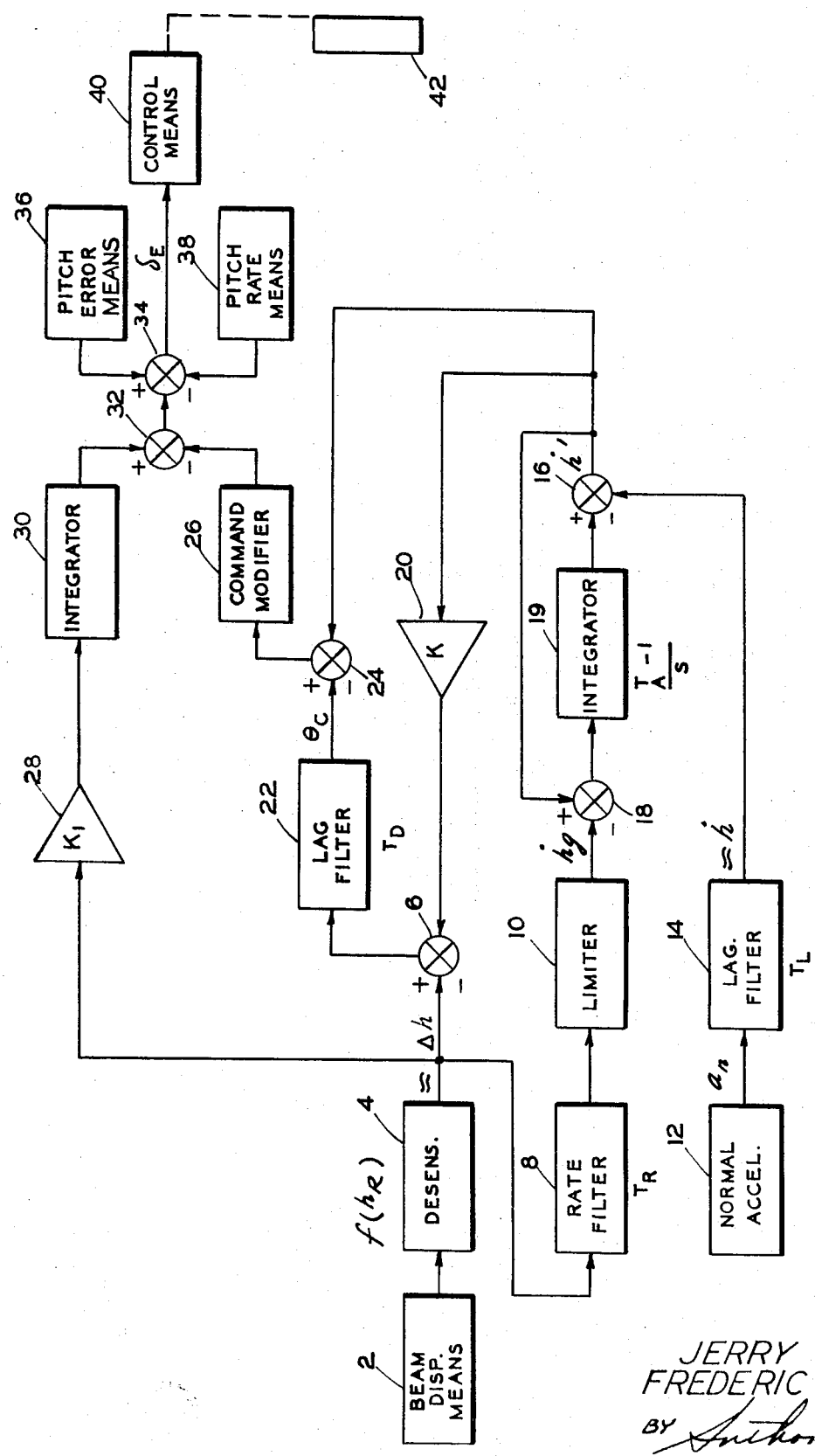
FIG. 1 is a block diagram of a flight control system including a glide slope coupler according to the invention.

With reference to FIG. 1, a beam displacement signal means 2 provides a signal corresponding to the displacement of an aircraft from a predetermined glide slope reference. The beam displacement signal is applied to a desensitizer 4 which desensitizes the signal as a function of radar altitude and provides a signal nearly proportional to the change in aircraft altitude $\Delta h$. The desensitized beam displacement signal ($\Delta h$) is applied to a summing means 6 and to a rate filter 8 having a time constant $T_R$. The filtered signal is applied to a limiter 10 which provides an altitude rate signal $\dot{h}_g$.

A normal accelerometer 12 provides a normal acceleration signal $A_n$ which is applied to a lag filter 14 having a time constant $T_L$ for providing a signal $\dot{h}$ nearly proportional to altitude rate. Signal $\dot{h}$ is applied to a summing means 16 and summed thereby with the output of an integrator 19, which integrates the signal from a summing means 18 to provide a signal $\dot{h}'$. Signal $\dot{h}'$ from summing means 16 is fed back to a summing means 18 and summed thereby with signal $\dot{h}_g$ from limiter 10, and the summed signal is integrated by integrator 19. Integrator 19 has a time constant $T_A - 1/S$.

Signal $\dot{h}'$ from summing means 16 is applied through an amplifier 20 having a gain $k$ to summing means 6 and summed thereby with signal $\Delta h$ from desensitizer 4. The summation signal from summing means 6 is applied to a lag filter 22 having a time constant $T_D$ for providing a pitch command signal $\theta_C$.

Signal $\dot{h}'$ from summing means 16 and signal $\theta_c$ from lag filter 22 are applied to a summing means 24 and the summation signal is applied to a command modifier 26. Signal $\Delta h$ from desensitizer 4 is applied through an amplifier 28 having a gain $K_1$ to an integrator 30. the signal from integrator 30 is applied to a summing means 32 and summed thereby with the signal from command modifier 26. The signal from summing means 32 is applied to a summing means 34 and summed thereby with a signal from a pitch error means 36 and a signal from a pitch rate means 38. Summing means 34 provides an elevator control signal $\delta_E$, which is applied to a control means 40, which may be a conventional servo system, for controlling aircraft elevators 42.

Signal $\dot{h}'$ from summing means 16 is a linear combination of filtered beam displacement and acceleration signals and may be expressed as follows:

$$\dot{h}' = \dot{h} \, (T_A S/T_A S+1) + \dot{h}_g \, (1/T_A S+1) ; \tag{1}$$

$$\text{where } \dot{h} = A_n \, T_L/T_L S+1 : \tag{2}$$

where $An/S = \dot{h}$ at frequencies above $T_L-1$ radians per second and where;

$\dot{h}_g = \Delta h \, S/T_R S+1$ ; where $\dot{h}_g = \dot{h}$ at frequencies below $T_R-1$ radians per second. If $T_R-1 > T_A - 1$ and $T_L - 1 < T_A - 1$, then equation 1 provides that signal $\dot{h}'$ is proportional to $\Delta h$ about the glide path. This signal is also used to drive elevator 42 as a primary path damping term and is used to complement the filtered beam displacement terms as follows:

$$\theta_c = K \, 1/T_D S + 1 \, [\Delta h + K \, \dot{h}'] ; \tag{3}$$

if $\dot{h}' = \dot{h}$ under noise free conditions and $\dot{h} = s \Delta h$, then $$\overline{\theta_c} = K \Delta h \, K S + 1/T_D S + 1 \tag{4}$$

if $K = T_D$, then $$\theta_c = K_D \Delta h \tag{5}$$

Figure 3:
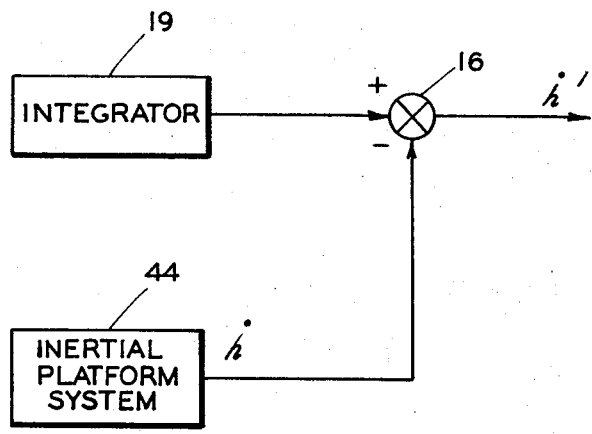
FIG. 3 shows an embodiment of the device of FIG. 1 using inertial navigation system (INS) data.

With reference to FIG. 3, it will be seen that signal $\dot{h}$ can be derived from an inertial platform system 44. Thus, signal $\dot{h}$ from inertial platform system 44 is combined with the signal from integrator 18 by summing means 16 to provide signal $\dot{h}'$. Since inertial platform systems operate on vertical acceleration, the uncertainties relative to the use of a body mounted normal accelerometer, such as normal accelerometer 12, are much smaller, and filter time constants $T_D$ and $T_A$ can be increased to provide further ILS noise rejection.

Figure 2:
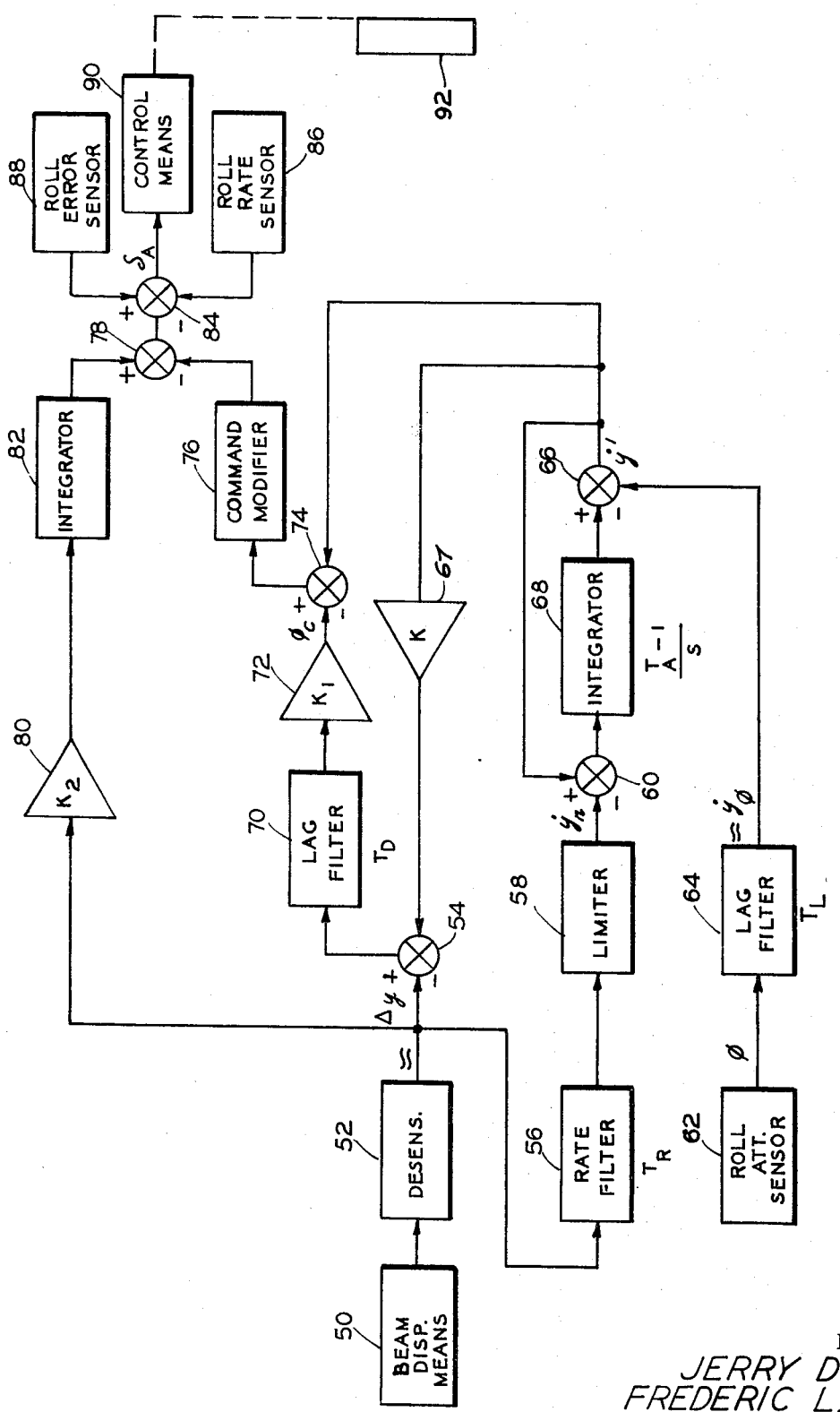
FIG. 2 is a block diagram of a flight control system including a localizer coupler according to the invention.

With reference, now, to FIG. 2, a beam displacement signal means 50 provides a signal corresponding to the displacement of the aircraft from a predetermined localizer reference. The signal from beam displacement means 50 is applied to a desensitizer 52 which provides a signal $\Delta Y$ which is approximately proportional to a cross track reference. Signal $\Delta Y$ is applied to a summing means 54 and to a rate filter 56 having a time constant $T_R$. The signal from rate filter 56 is applied to a limiter 58 which provides a cross track rate signal $\dot{Y}_n$ and which signal $\dot{Y}_n$ is applied to a summing means 60.

A signal $\phi$ from a roll altitude sensor 62 is applied to a lag filter 64 having a time constant $T_L$ for providing a cross track rate signal $\dot{y}_\phi$. Signal $\dot{y}_\phi$ is applied to a summing means 66 and summed thereby with the output of an integrator 68 having a time constant $T_A - 1/S$ to provide a signal $\dot{y}'$.

Signal $\dot{y}'$ from summing means 66 is fed back to summing means 60 and summed thereby with signal $\dot{Y}_n$ from limiter 58. The summation signal from summation means 60 is integrated by integrator 68 and the integrated signal is applied to summing means 66 and summed with the signal from filter 64 to provide signal $\dot{y}'$.

Signal $\dot{y}'$ is applied through an amplifier 67 having a gain K to summation means 54 where the amplified signal is summed with signal $\Delta Y$ from desensitizer 52. The summation signal from summation means 54 is applied to a lag filter 70 having a time constant $T_D$ and therefrom to an amplifier 72 having a gain $K_1$. Amplifier 72 provides a roll command signal $\phi_c$.

Signal $\phi_c$ from amplifier 72 is applied to a summation means 74 and summed thereby with signal $\dot{Y}'$ from summation means 66. The summation signal from summation means 74 is applied to a command modifier 76. The signal from command modifier 76 is applied to a summation means 78 and summed thereby with signal $\Delta Y$ from desensitizer 52 applied through an amplifier 80 having a gain $K_2$ and through an integrator 82.

The signal from summation means 78 is applied to a summation means 84 and summed thereby with a signal from a roll rate sensor 86 and with a signal from a roll error sensor 88. The summation signal from summation means 84 is a roll control signal $\delta_A$ which is applied to a control means 90, which may be a conventional type servo system, for controlling ailerons 92 of the aircraft.

As shown in FIG. 2, signal $\dot{y}'$ is related to signal $\Delta y$ and roll attitude $\phi$ as follows:

$$\dot{y}' = \dot{y}_\phi (T_A S/T_A S + 1) + \dot{y}_n (1/T_A S + 1/3) \tag{6}$$

The aircraft cross track rate that results when the bank angle, $\phi$ changes is $\dot{y}_\phi = g\phi/s$, where $g =$ acceleration to due gravity. At frequencies above $T_A - 1$ radians per second, lag filter 64 operates as an integrator and its output relative to $\phi$ is proportional to $\dot{y}$. Signal $\dot{y}'$ follows signal $\dot{y}_\phi$ for frequencies above $T_A - 1$ radians per second and attenuates the signal for lower frequencies. The term $\dot{y}_n$ is a cross track rate derived by a lead network as follows:

$$\dot{y}_n = \Delta y \, (S/T_R S + 1), \tag{7}$$

where $T_R$ is very small relative to $T_A$. At frequencies below $T_A - 1$ radians per second, beam rate signal $\dot{y}_n$ is passed and at higher frequencies, the beam rate term is attenuated:

$$\dot{y}' = \dot{y} \, T_A S/T_A S+1 + \dot{y} \, (1/T_A S + 1) \tag{8}$$

$$\dot{y}' = \dot{y} \, (T_A S + 1/T_A S + 1) \tag{9}$$

$$\dot{y}' = \dot{y} \tag{10}$$

Under noisefree consitions where
$\dot{y}_\phi = \dot{y}_n = \dot{y}$ at high frequencies, and
$y_n = \dot{y}$ at low frequencies, signal $\dot{y}'$ is a wideband version of true beam rate. Beam noise is heavily filtered, particularly at high frequencies. The constant $T_A - 1/S$ is normally chosen to attenuate beam noise at frequencies that include the rolling response of the aircraft (typically, 1 radian/second).

Signal $\dot{y}'$ is processed as the primary track damping term. Additionally, the signal is applied to lag filter 70. The output of filter 70 may be expressed as follows:

$$\phi = K_1 \, (1/T_D S + 1) \, [Y + K \, \dot{y}'] \tag{11}$$

Since, under noisefree conditions, $\dot{y}' = \dot{y}$; then $$\phi_c = K_D \, (1/T_D S - 1) \, [y + SKy] \tag{12}$$

$$\phi_c = K_D y \, (K S + 1/T_D S + 1) \tag{13}$$

Setting $K = T_D$ causes the output of filter 70 to be a wideband version of the true aircraft track deviation. Beam noise is attenuated for frequencies above $T_D - 1$ radians per second.

Figure 4:
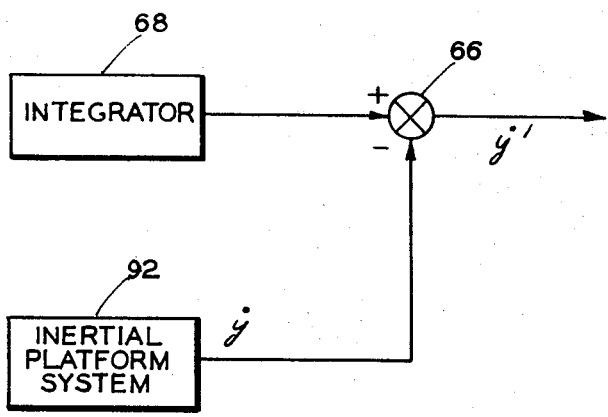
FIG. 4 is an embodiment of the device of the invention shown in FIG. 2 using inertial navigational system (INS) data.

FIG. 4 shows that the filtered roll attitude sensor which generates the short term cross track signal $\dot{Y}_\phi$ can be replaced by an inertial platform system 92.

Thus platform system 92 generates signal $\dot{Y}$, and which signal is combined by summation means 66 with the signal from integrator 68. The same kind of long term uncertainties exist for this signal, although at a lower level as for the roll offsets. Therefore the filter time constants $T_A$ and $T_D$ can be increased, when the INS $\dot{Y}$ reference is used, to further reduce the effects of ILS noise.

From the aforegoing description of the invention with reference to the drawings, it will be seen that both the localizer and glide path system s are based on an arrangement whereby heavily filtered rate signals are formed to provide a good low frequency beam rate reference. High frequency noise (nominally above 1 rad/-sec. is increasingly attenuated. A short term beam rate reference signal is formed using filtered roll attitude in localizer and filtered normal acceleration in glide path. In this manner, low frequency effects such as null offsets of the inertial sensors are greatly attenuated.

The low and high frequency beam rate terms are combined to form a single wideband, relatively noise free, beam rate signal. This method of forming a useful signal from two independent sources is called the complementary filter method. The complemented beam rate signals are used in two ways; they provide primary damping for the ILS control loops and they are used in a second stage of complementation to filter the beam displacement signal to further reduce the beam noise susceptibility of the system.

It will be understood that the components of the invention described herein are all of the conventional type well known in the flight control art. The novelty of the invention resides not in the components themselves but in their arrangement as shown in the drawings.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An aircraft control system comprising:
    means for providing a signal corresponding to the displacement of the craft from a predetermined reference beam;
    means for providing a low frequency beam rate signal;
    means for providing a high frequency beam rate signal;
    means connected to both of the beam rate signal means and to the beam displacement signal means and responsive to the signals therefrom for providing a control signal including means for combining the high and low frequency beam rate signals, means for desensitizing the beam displacement signal, means for combining the desensitized beam displacement signal and the combined beam rate signal, means for filtering the combined signal from the last mentioned means to provide a command signal and means connected to the command signal means for providing the control signal in response to the signals therefrom; and
    means connected to the control signal means and responsive to the control signal for controlling the craft.

2. An aircraft control system as described by claim 1, wherein the means for providing a high frequency beam rate signal includes:
    means for providing a normal acceleration signal; and
    means having a predetermined lag constant for filtering the normal acceleration signal to provide the high frequency beam rate signal, said signal being nearly proportional to aircraft altitude rate.

3. An aircraft control system as described by claim 1, wherein the means for providing a low frequency beam rate signal includes;
    means for desensitizing the beam displacement signal;
    means for filtering the desensitized signal;
    means for limiting the filtered signal; and
    means for integrating the limited signal.

4. An aircraft control system as described by claim 3, including:
    means for combining the integrated signal and the high frequency beam rate signal;
    means for combining the combined signal and the limited signal; and
    the integrator integrating the signal from the last mentioned combining means.

5. An aircraft control system as described by claim 1, wherein the means connected to the desensitizing means and to the command signal means for providing the control signal in response to the signals therefrom includes:
    means for integrating the desensitized signal;
    means for modifying the command signal;
    means for combining the integrated signal and the modified signal;
    means for providing an attitude error signal;
    means for providing an attitude rate signal; and
    means for combining the combined integrated and modified signal, the attitude error signal and the attitude rate signal to provide the control signal.

6. An aircraft control system as described by claim 5, wherein:
    the means for providing an attitude error signal provides a pitch error signal; and
    the means for providing an attitude rate signal provides a pitch rate signal.

7. An aircraft control system as described by claim 5, wherein:
    the means for providing an attitude error signal provides a roll error signal; and
    the means for providing an attitude rate signal provides a roll rate signal.

* * * * *